US007230628B1

(12) United States Patent
Haeberli

(10) Patent No.: US 7,230,628 B1
(45) Date of Patent: *Jun. 12, 2007

(54) PREVIEWING A FRAMED IMAGE PRINT

(75) Inventor: Paul Haeberli, San Francisco, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/684,595

(22) Filed: Oct. 5, 2000

(51) Int. Cl.
*G09G 5/00* (2006.01)

(52) U.S. Cl. .................... 345/582; 345/634

(58) Field of Classification Search .............. 707/517, 707/526, 502, 530, 527; 345/619, 653, 657, 345/607, 623, 652, 419, 582; 396/3; 348/587
See application file for complete search history.

(56) References Cited

U.S. PATENT DOCUMENTS

| 4,920,337 | A | * | 4/1990 | Kuo .......................... 707/526 |
| 5,179,637 | A | | 1/1993 | Nardozzi ................... 358/1.15 |
| 5,179,638 | A | * | 1/1993 | Dawson et al. ............. 345/582 |
| 5,282,262 | A | * | 1/1994 | Kurashige .................. 345/426 |
| 5,343,386 | A | | 8/1994 | Barber ........................ 700/90 |
| 5,369,736 | A | * | 11/1994 | Kato et al. .................. 345/582 |
| 5,473,737 | A | * | 12/1995 | Harper ....................... 345/592 |
| 5,550,960 | A | * | 8/1996 | Shirman et al. ............ 345/582 |
| 5,561,746 | A | * | 10/1996 | Murata et al. .............. 345/419 |
| 5,606,365 | A | | 2/1997 | Maurinus et al. ......... 348/222.1 |
| 5,687,306 | A | * | 11/1997 | Blank ......................... 345/634 |
| 5,748,194 | A | * | 5/1998 | Chen .......................... 345/427 |
| 5,751,950 | A | | 5/1998 | Crisan ........................ 713/202 |
| 5,760,916 | A | | 6/1998 | Dellert et al. ............... 358/408 |
| 5,760,917 | A | | 6/1998 | Sheridan .................... 358/442 |
| 5,778,430 | A | | 7/1998 | Ish et al. ..................... 711/133 |
| 5,781,174 | A | * | 7/1998 | Uya et al. ................... 345/639 |
| 5,787,466 | A | | 7/1998 | Berliner ...................... 711/117 |
| 5,809,280 | A | | 9/1998 | Chard et al. ................ 711/160 |
| 5,845,303 | A | * | 12/1998 | Templeman ................ 707/517 |
| 5,848,201 | A | * | 12/1998 | Kajiwara .................... 382/296 |
| 5,870,771 | A | * | 2/1999 | Oberg ........................ 707/502 |
| 5,890,213 | A | | 3/1999 | Sokolov ...................... 711/113 |
| 6,014,137 | A | * | 1/2000 | Burns ......................... 345/747 |
| 6,047,130 | A | * | 4/2000 | Oles .............................. 396/1 |
| 6,064,399 | A | * | 5/2000 | Teo ............................ 345/629 |
| 6,065,969 | A | * | 5/2000 | Rifkin et al. ................ 434/100 |
| 6,104,438 | A | * | 8/2000 | Saito .......................... 348/587 |
| 6,124,859 | A | * | 9/2000 | Horii et al. ................. 345/427 |
| 6,167,382 | A | * | 12/2000 | Sparks et al. ................ 705/26 |
| 6,202,073 | B1 | * | 3/2001 | Takahashi ................... 707/517 |

(Continued)

FOREIGN PATENT DOCUMENTS

WO        WO 98/36556        8/1998

*Primary Examiner*—Ryan Yang
(74) *Attorney, Agent, or Firm*—Xin Wen

(57) ABSTRACT

An apparatus and method of generating a visual representation of an image based product. Where the image based product is a picture image, the method produces a framed prototype image showing the picture image framed within a frame. The method includes providing a frame image showing the frame in a perspective view. The frame image has a picture portion corresponding to the portion of the frame used to view a picture mounted in the frame. The method includes mapping the picture image to the picture portion of the frame image in order to generate the frame prototype image.

20 Claims, 13 Drawing Sheets

U.S. PATENT DOCUMENTS

| | | |
|---|---|---|
| 6,751,339 B1 * | 6/2004 | Windle et al. .............. 382/108 |
| 6,831,661 B1 * | 12/2004 | Itoh et al. ................... 345/629 |
| 2001/0010772 A1 * | 8/2001 | Nakajima .................... 400/62 |
| 2002/0030638 A1 * | 3/2002 | Weiner ........................ 345/30 |
| 2002/0070982 A1 * | 6/2002 | Hill et al. ................... 345/835 |

* cited by examiner

PREVIEWING A FRAMED IMAGE PRINT

TECHNICAL FIELD

This application relates to a method and system of previewing a framed image print, for example, by displaying a perspective frame preview image on a global computer network.

BACKGROUND

One conventional way to display image prints (e.g., photographs) is to mount the image print in a frame. A wide variety of frames are available, differing, for example, in size, style, construction material, and shape. Typically, a customer will select a particular frame in which to mount an image print based, at least in part, on how the image print would look mounted in the selected frame.

For example, a customer can take a picture using a conventional film-based camera and then bring the exposed film to a photo finishing laboratory to have the laboratory develop the exposed film and generate an image print (which is typically referred to as a "photograph" in the film-based photography context). The photograph is then returned to the customer, who can then physically take the photograph to a frame shop (that is, to a "brick-and-mortar" frame shop) in order to select a frame in which to mount the photograph. I selecting the frame, the customer can physically place the photograph in or near a given frame in order to get an idea of how the photograph would look mounted in that particular frame. In this way, the customer can relatively quickly determine how the photograph would look mounted in various frames.

When a customer wishes to have a high-quality image print generated from a digital image file (for example, one captured using a digital camera), the customer need not physically take the digital image file to a photo-finishing laboratory and instead can electronically transmit the digital image file to an "online" photo-finishing laboratory using a computer network such as the Internet. For example, the customer can execute an Internet browser program (referred to here as a "browser") such as NETSCAPE NAVIGATOR (R) (which is commercially available from Netscape Communications Corporation of Mountain View, Calif., USA), direct the browser to a web site associated with the online photo-finishing laboratory, and upload the digital image file to the server hosting the web site. The online photo-finishing laboratory can then take the digital image file from the web server and produce a high-quality image print from the digital image file in a conventional manner. The online photo-finishing laboratory then typically sends the high-quality image print to the customer (or another person designated by the customer such as a relative or friend) using a delivery service such as the UNITED STATES POSTAL SERVICE or FEDERAL EXPRESS(R).

Some online print laboratories also allow a customer or select and purchase frames via their web sites. However, the customer typically cannot physically place an image print in or near various frames in order to visualize how an image print will look in various frames, as can be done in a traditional brick-and-mortar frame shop. One conventional approach to helping the customer visualize how an image print will look in a given frame is to create, and display for the customer, a frame preview image in which an electronic copy of the customer's image (referred to here as a "picture image") is pasted into a two-dimensional picture of a given frame (referred to here as a "frame image"). FIG. 1 illustrates one example of such a conventional frame preview image 100. The customer's image 102 is pasted into the portion 104 of the frame image 106 corresponding to the part of the frame where an image print would be mounted (referred to here as the "picture area"). Such a conventional approach is implemented by EFRAMES.COM(TM), an online print laboratory and frame retailer located on the Internet at www.eframes.com. As shown in FIG. 1, a frame preview image generated according to such a conventional approach typically only shows a head-on (that is, non-perspective) view of the framed image print itself.

SUMMARY

Implementations may include various combinations of the following features.

In one aspect, the invention provides a method of generating a frame prototype image showing a picture image framed within a frame. The method includes providing a frame image showing the frame in a perspective view. The frame image has a picture portion corresponding to the portion of the frame used to view a picture mounted in the frame. The method includes mapping the picture image to the picture portion of the frame image in order to generate the frame prototype image.

Aspects of the invention can include one or more of the following features. The method can include identifying a picture portion of the frame image. Identifying the picture portion of the frame image can include providing a mat identifying the picture portion of the frame image. The mat can include a plurality of pixels, each pixel having a pixel value. Identifying the picture portion of the frame image can include setting each pixel in the mat the corresponds to the picture portion of the frame image to a first pixel value. Identifying the picture portion of the frame image can include identifying the outer perimeter of the picture portion of the frame image. The picture portion of the frame image can have a quadrilateral shape and identifying the picture portion of the frame image can include identifying the four corners of the picture portion. The method can include displaying the frame prototype image.

Mapping the picture image to the picture portion of the frame image can include texture mapping the picture image to the picture portion of the frame image. Mapping the picture image to the picture portion of the frame image can include mapping the picture image to the picture portion of the frame image using the illumination of the picture portion of the frame image. The frame image can be captured using a digital camera.

In another aspect, the invention provides a computer program product tangibly embodied in a computer-readable medium, for generating a frame prototype image showing a picture image framed within a frame. The computer program includes instructions operable to cause a computer to receive the picture image, store a frame image showing a frame in a perspective view and a mat identifying the picture portion of the frame image and map the picture image to the picture portion of the frame image in order to generate the frame prototype image.

The computer program can further include instruction operable to cause the computer to generate the map by identifying the picture portion of the frame image and to identify the picture portion of the frame image by identifying the outer perimeter of the picture portion of the frame image.

In another aspect, the invention provides a system for generating a frame prototype image showing a picture image framed within a frame. The system includes a client computer in communication with a computer network, and a server, in communication with a computer network, having server software embodied in a computer-readable medium. The server software includes instructions operable to cause the server to receive the picture image from the client computer, store a frame image showing the frame in a perspective view and a mat identifying the picture portion of the frame image and map the picture image to the picture portion of the frame image in order to generate the frame prototype image wherein the client computer includes client software embodied in a computer-readable medium. The client software includes instructions operable to cause the client computer to upload the picture image to the server.

In another aspect, the invention provides a method of generating a visual representation of an image based product. The method includes providing an image to be included in the image based product and providing a perspective image showing the image based product in a perspective view. The perspective image has a picture portion corresponding to the portion of the image based product used to view a picture mounted on the image based product. The method includes mapping the image to the picture portion of the perspective image in order to generate the perspective prototype image.

Aspects of the invention can include one or more of the following features. The image based product can be a framed picture, a photocard or photo greeting card. The method can include displaying the perspective image in an environment that provides a context for viewing the image based product.

One or more of the following advantages may be provided. The systems and methods described herein provide a more realistic presentation of an image based product. The image based product can be an image in a frame. Other image based products such as photocards, greeting cards, t-shirts, mugs, and other novelty items can also be displayed using a perspective view that enhances the appeal of the product. The user's view can be enhanced by lighting and other effects and displayed in an environment to help simulate the appearance of the image based product in various settings.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
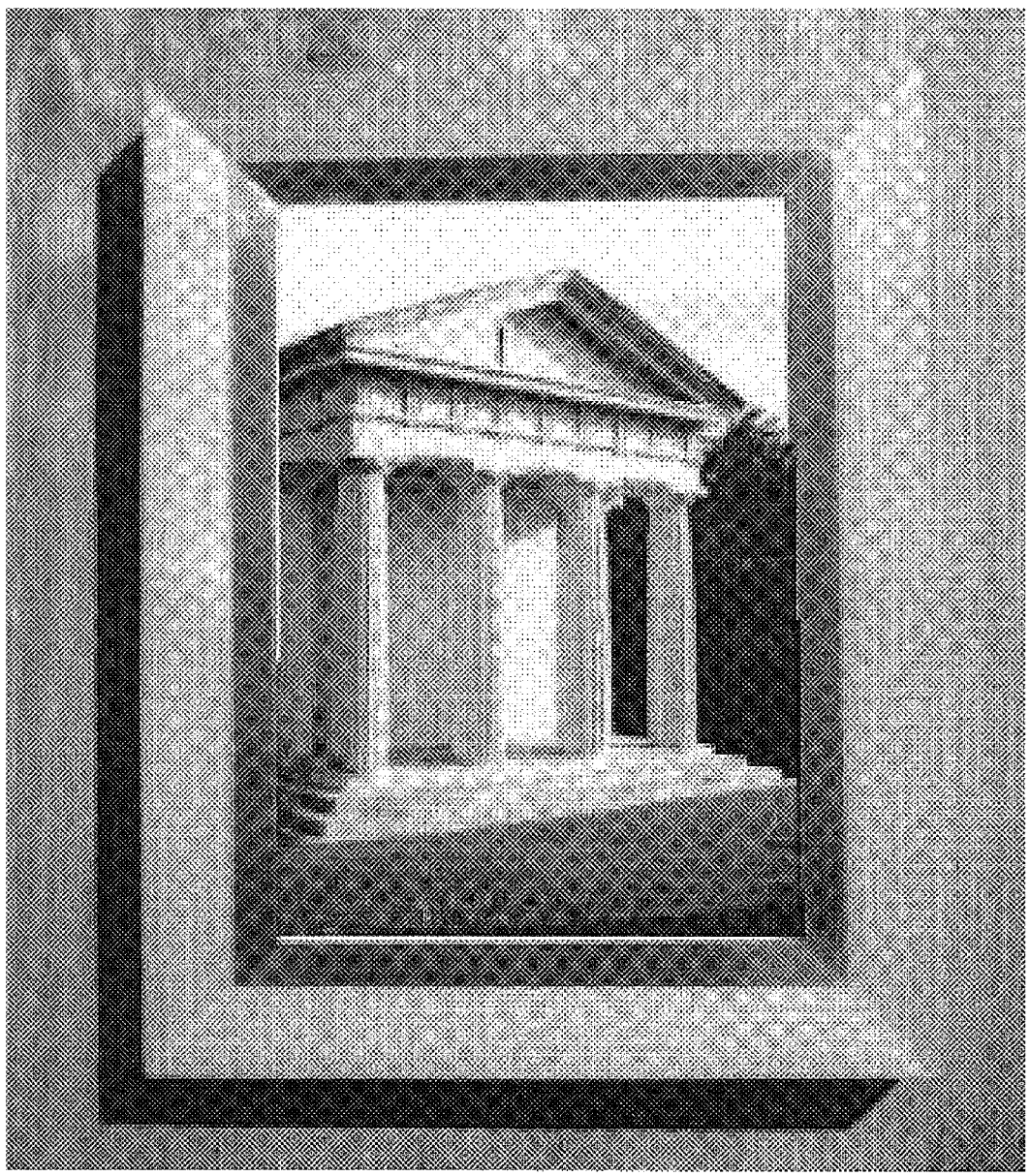
FIG. 1 is an example of a non-perspective frame preview image.
Figure 2:
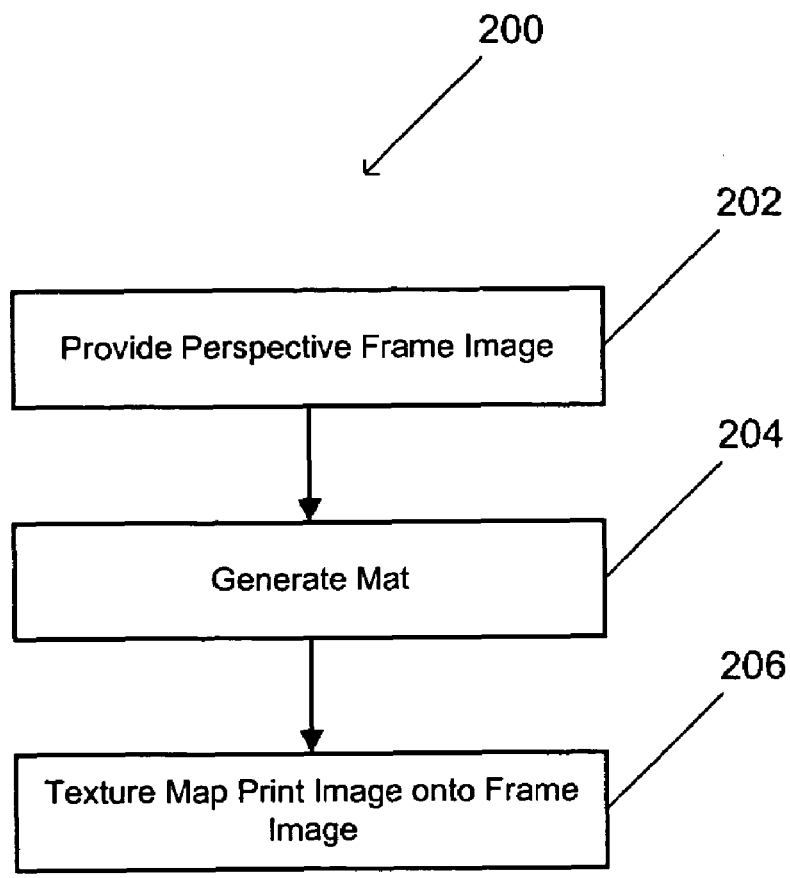
FIG. 2 is a flow diagram of a process of generating a perspective frame preview image showing what a selected picture image would look like mounted in a selected frame.
Figure 3A:
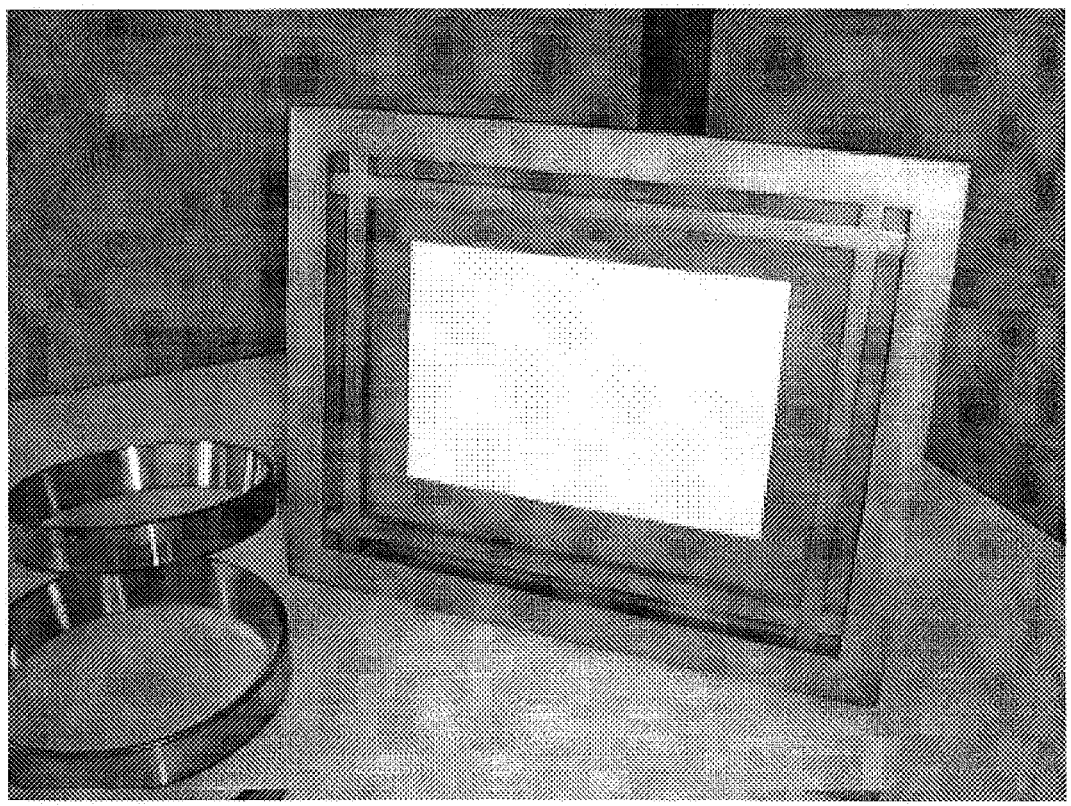
FIGS. 3A-3D show examples of a perspective frame image, mat, print image, and perspective frame preview image, respectively.

FIG. 2 is a flow diagram of a process 200 of generating a perspective frame preview image showing what a selected picture image would look like mounted in a selected frame. The process 200 includes providing a perspective frame image showing the frame in a perspective view (block 202). A "perspective frame image" is an image that shows an in-perspective view of a frame. In other words, the frame in such a perspective frame image is not shown in a head-on view. For example, a frame can be arranged in a typical scene in which the frame might be displayed (e.g., on a table) and then a digital camera can be used to capture a perspective image of the frame as it appears in the scene. Also, a white piece of paper (or other suitable material) can be mounted in the frame where an image print would be displayed. As a result, the perspective frame image will include a white region located where an image print would be visible in the frame (also referred to here as the "picture area"). An example of such a perspective frame image 300 having a picture area 302 is shown in FIG. 3A.

Figure 3B:
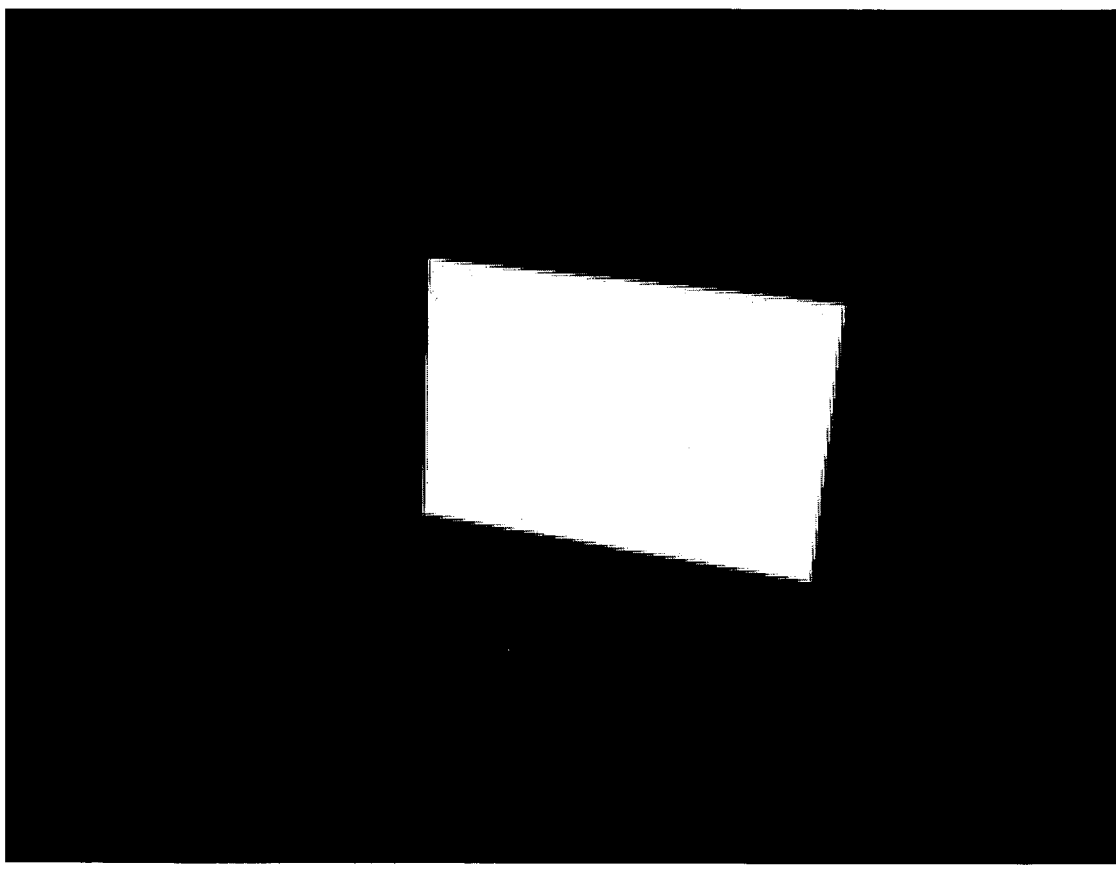

The process 200 also includes generating a mat from the perspective frame image (block 204). The mat is an image that has a corresponding pixel for each pixel in the perspective frame image. In one implementation, each pixel in the mat has one of two values—one value (e.g., a value representing the color white) indicates that the corresponding pixel in the perspective frame image is included in the picture area and the other value (e.g., a value representing the color black) indicates that the corresponding pixel in the perspective frame image is outside of the picture area. For example, the mat can be generated manually using image-processing software such as ADOBE PHOTOSHOP(R) or the GNU IMAGE MANIPULATION PROGRAM ("the GIMP"). A user can identify the outer boundary of the picture area by inspecting the perspective frame image in order to locate the outer boundary of the white region. For example, if the picture area is a quadrilateral, a user can locate the four corners of the white region, which can be used by the image-processing software to define the picture area. Then, the user can cause the image-processing software to assign the value associated with the color white to those pixels in the mat that corresponds to pixels in the picture area. Also, the user can cause the image-processing software to assign the value associated with the color black to those pixels in the mat that correspond to pixels outside of the picture area. An example of such a mat 302 is shown in FIG. 3B.

Figure 3C:
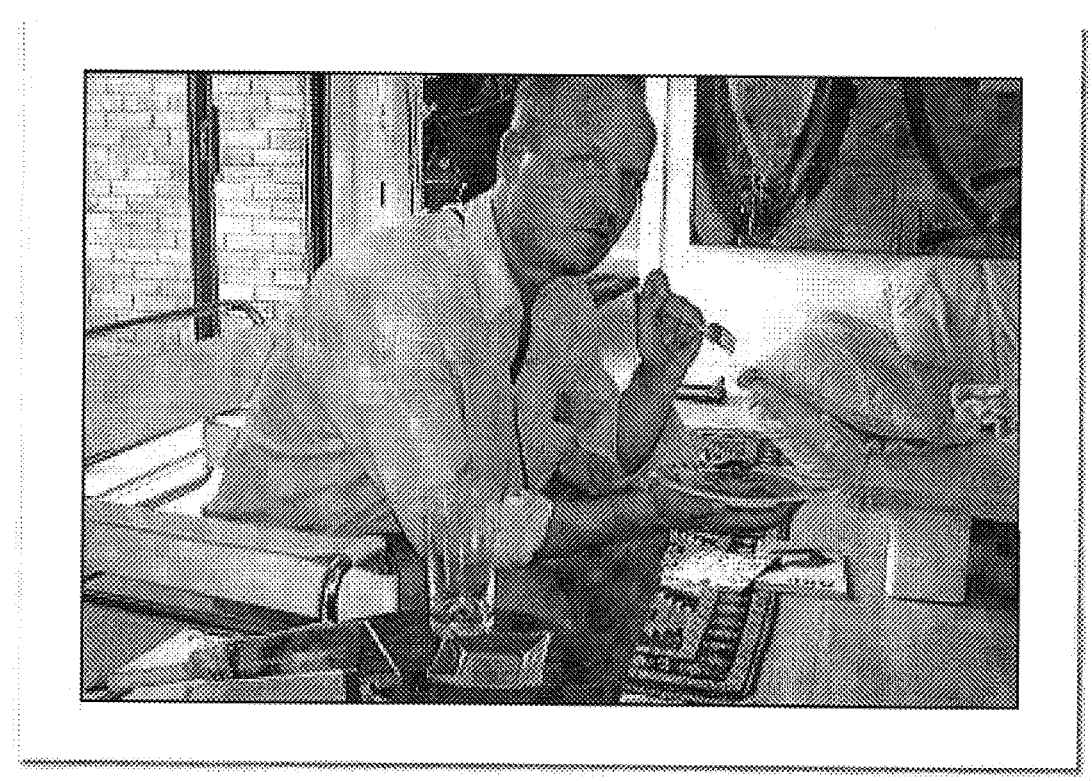
Figure 3D:
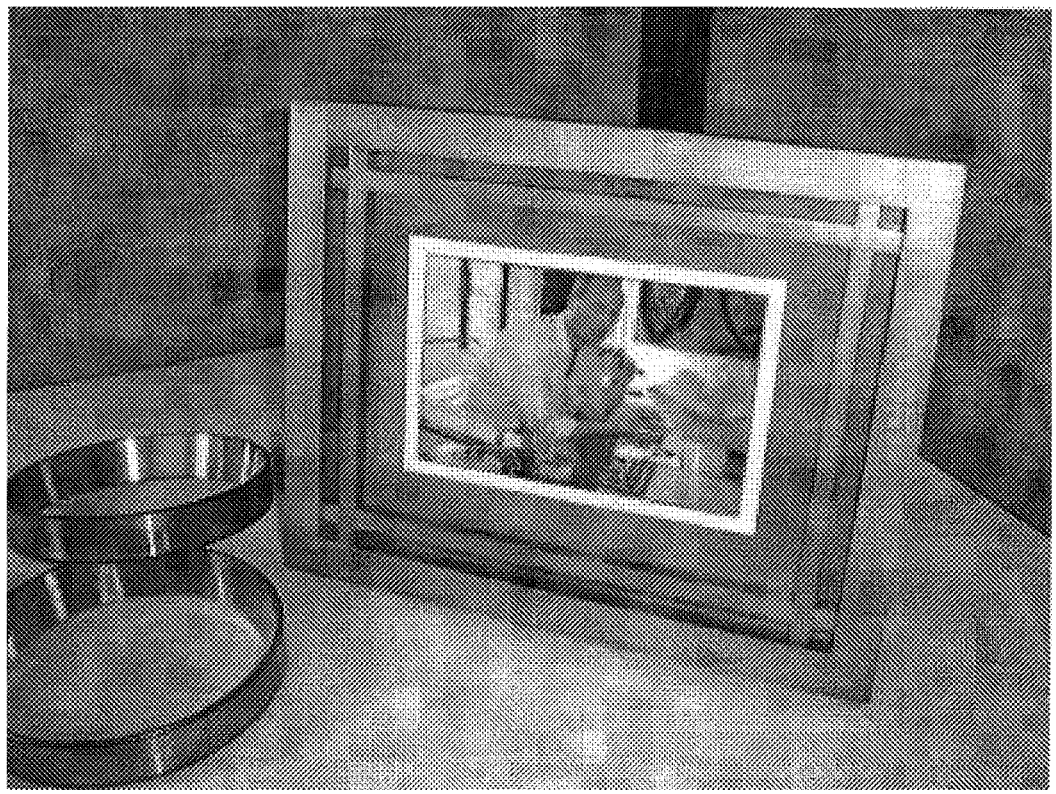

Then, a picture image is texture mapped onto the picture area of the perspective frame image (block 206). This creates a perspective frame preview image that shows how the print image will look mounted in the selected frame. In general, texture mapping lays an image (the "texture") onto an object in a scene. When mapping the image onto the object, the color of the object at each pixel is modified by a corresponding color from the image. In this case, the picture image is the "texture" and the picture area is the "object" onto which the texture is mapped. An example of a print image 306 is shown in FIG. 3C, and an example of a perspective frame preview image 308 showing how the print image 306 will look mounted in the frame shown in the perspective frame image 300 is shown in FIG. 3D.

Figure 4:
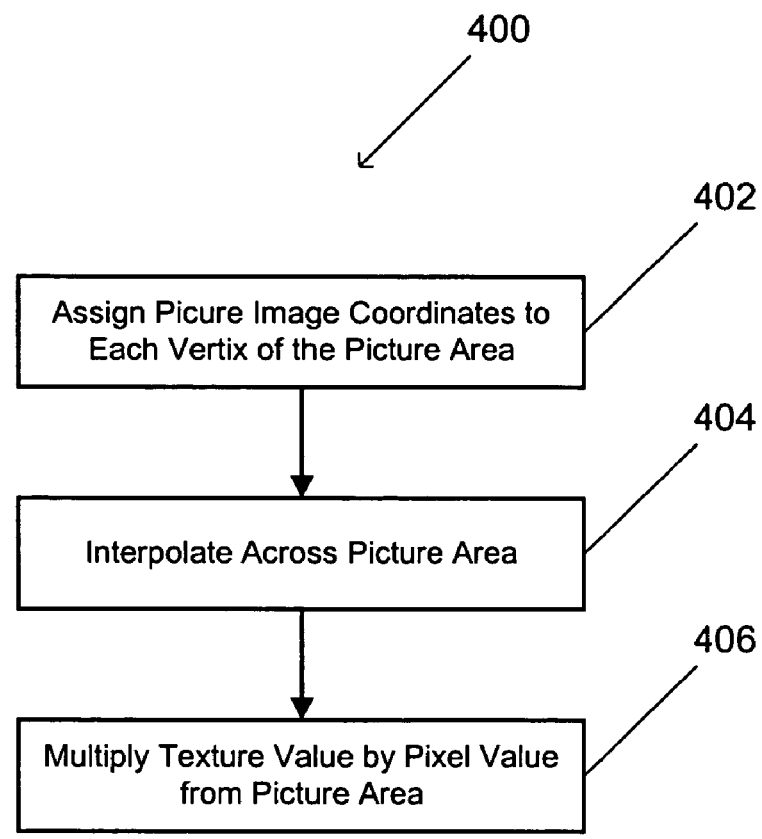
FIG. 4 is a flow diagram of a process of texture mapping a print image onto the picture area of a perspective frame image.

FIG. 4 is a flow diagram of a process 400 of texture mapping a picture image onto the picture area of a perspective frame image. First, picture image coordinates are assigned to each of the vertices of the picture area (block 402). The vertices of the picture area can be identified using the mat. For example, coordinates associated with each of the four corners of the picture image can be assigned to respective corners of the picture area. These coordinates index the picture image. Next, the coordinates are interpolated across the polygon to determine, at each of the picture area's pixels, a texture value (block 404). This texture value is then multiplied by the original value of that pixel (block 406). In this way, the illumination of the white piece of paper used in the perspective frame image is used to illuminate the texture-mapped picture image in the final frame preview image. This tends to cause the resulting frame preview image to look more realistic. For example, reflections caused by glass that typically covers a framed image print tend to reduce the contrast of the image print when viewed through the glass. Multiplying the texture value by the original value of the pixel reduces the contrast of the texture-mapped picture image in a manner that reproduces this effect.

Figure 5:
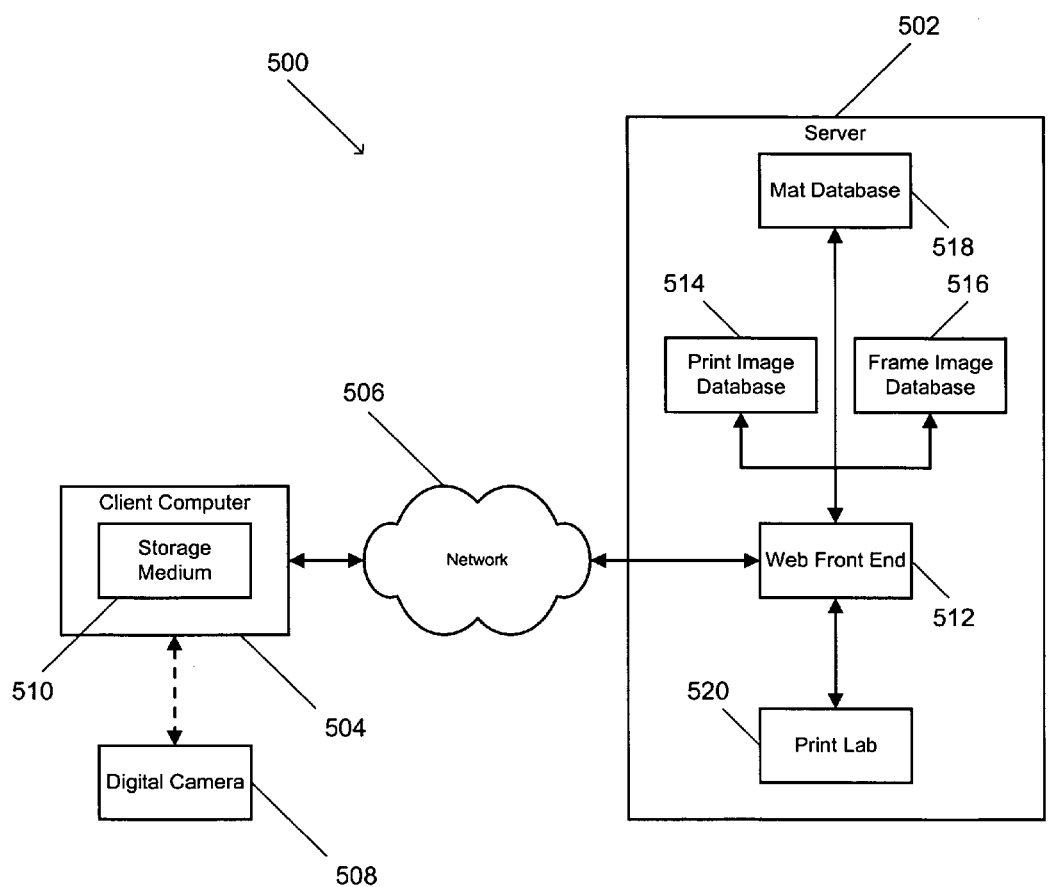
FIG. 5 is a block diagram of system that can be used to generate perspective frame preview images.

One implementation of a system 500 for generating perspective frame preview images is shown in FIG. 5. System 500 includes a server 502 that is connected to one or more client computers 504 by a network 506 such as the Internet. The client computers 504 can be connected to a digital camera 508 so that a user can upload captured digital images from the digital camera 508 to the client computer 504. Alternatively, or in addition, the client computer 504 can execute image processing software such as ADOBE PHOTOSHOP® or the GNU IMAGE MANIPULATION PROGRAM (the "GIMP") in order to create and/or edit digital images. The client computer 504 includes a storage medium 510 such as a hard disk for storing the digital images. The client computer 504 can be implemented using a variety of hardware and software. For example, the client computer 504 can be a general-purpose device such as a personal computer, portable computer, or portable digital assistant ("PDA") or as a special-purpose device such as point-of-sale kiosk having an embedded computer.

The client computer 504 is connected to the network 506, for example, using a modem or network interface card. The system 500 can be implemented as a browser-based system in accordance with the standard protocols for communicating over the Word Wide Web. In such an implementation, a user of the client computer 504 can execute a browser to connect to and interact with the server 502. The server 502 includes a web front end 512 that manages the communications with the client computer 504. The user of the client computer 504 can upload digital images (that is, print images) to the server 502. The web front end 512 receives the uploaded digital images and stores them in a print image database 514.

The server 502 also includes a perspective frame image database 516 and a mat database 518 for storing, respectively, perspective frame images and associated mats. Several different perspective frame images and associated mats can be prepared and stored in the perspective frame image database 516 and the mat database 518 so that a user of the client computer can generate one or more perspective frame preview images with one or more selected print images.

After viewing one or more perspective frame preview images, the user of the client computer 504 can order a selected image print mounted in a selected frame. The server 502 includes, or is connected to, a print lab 520. The print lab 520 receives the user's selection of a print image and generates an image print from the selected print image. The print lab 520 can include appropriate facilities for mounting the image print in the selected frame. In addition, the print lab 520 can generate other image-based products. For example, the print lab 516 can print or otherwise embody the selected images in other items such as clothing, buttons, mugs, cards, invitations, and calendars. The items generated by the print lab 520 can be shipped to the user using a conventional shipping service such as the UNITED STATES POSTAL SERVICE or FEDERAL EXPRESS®. Commonly assigned co-pending U.S. patent application Nos. 09/428,871 (entitled "MULTI-TIERED IMAGE DATABASE" and filed Oct. 27, 1999), 09/436,704 (entitled "DISTRIBUTING IMAGES TO MULTIPLE RECIPIENTS" and filed Nov. 9, 1999), and 09/450,075 (entitled "PRINTING IMAGES IN AN OPTIMIZED MANNER" and filed Nov. 29, 1999), all of which are incorporated herein by reference, disclose various approaches to implementing a system 500 for generating image-based products from digital images.

Figure 6:
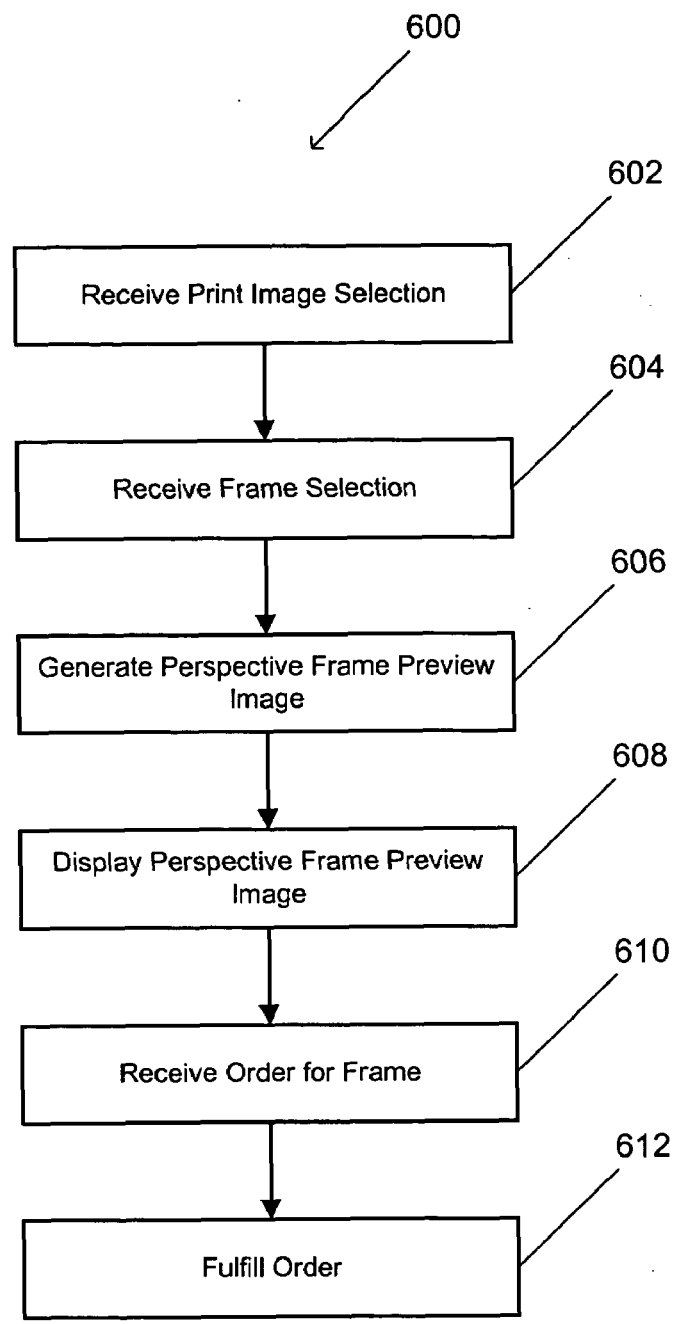
FIG. 6 is flow diagram of a process of providing a perspective frame preview image over a computer network such as the Internet.
Figure 7A:
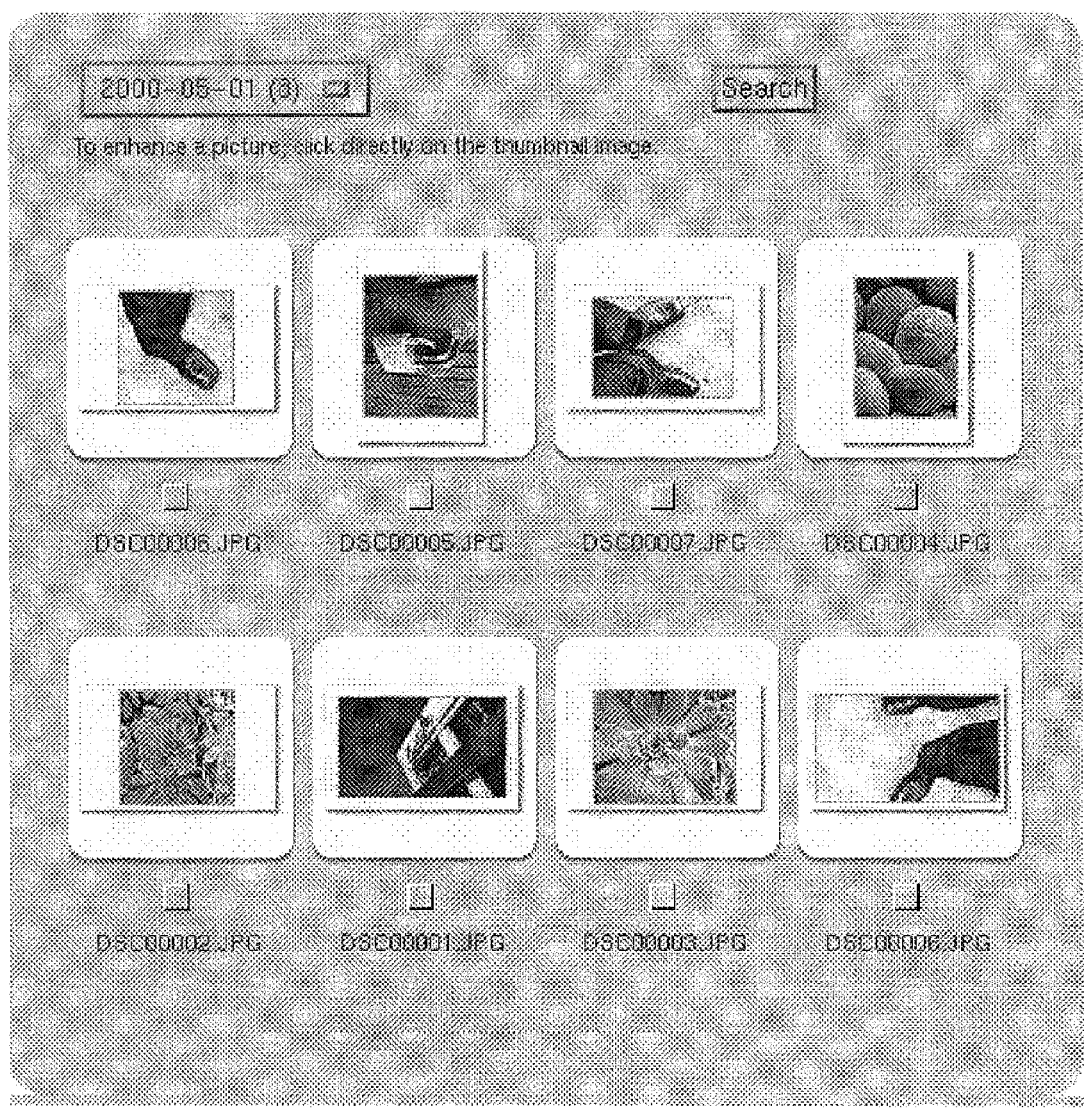
FIGS. 7A-7C are example screens displayed during the process shown in FIG. 6.

FIG. 6 is flow diagram of a process 600 of providing a perspective frame preview image over a computer network such as the Internet. The process 600 includes receiving a print image selection (block 602). The print image selection can be received, for example, over the Internet. The user can upload one or more print images to the server 502 (where they are stored in the print image database 514) and select a print image from those print images stored in the print image database 514. For example, web front end 512 can generate and transmit to the browser a web page 700 (shown in FIG. 7A) that includes thumbnail images 702 of one or more print images stored in the print image database 514 (e.g., print images the user has previously uploaded to the server 502). In one embodiment, the user can select one of the print images by clicking on the thumbnail image 702 associated with the selected print image.

Figure 7B:
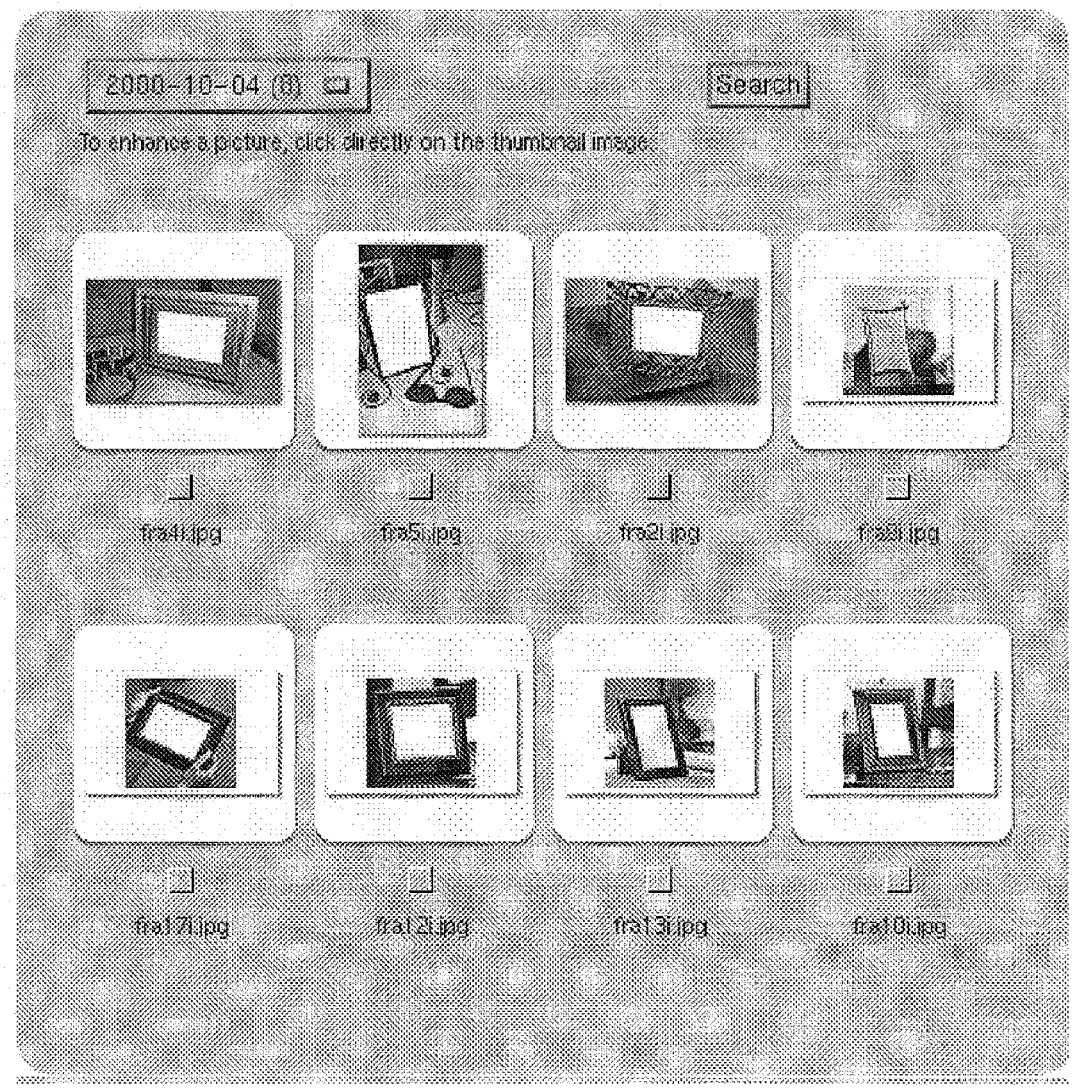

The process 600 also includes receiving a frame selection (block 604). For example, the web front end 512 can supply to the browser a web page 704 (shown in FIG. 7B) including thumbnail images 706 of one or more frames from which the user can chose. In one embodiment, the user selects a frame by clicking on the thumbnail image 706 associated with the selected frame.

Process 600 also includes generating a perspective frame preview image in which the selected print image is shown mounted in the selected frame (block 606 shown in FIG. 6). The print image can be retrieved from the print image database 514, the perspective frame image for the selected frame can be retrieved from the perspective frame image database 516, and the mat associated with the selected frame can be retrieved from the mat database 518. Then, the perspective frame preview image can be generated, for example, in accordance with the process 200 shown in FIG. 2.

Figure 7C:
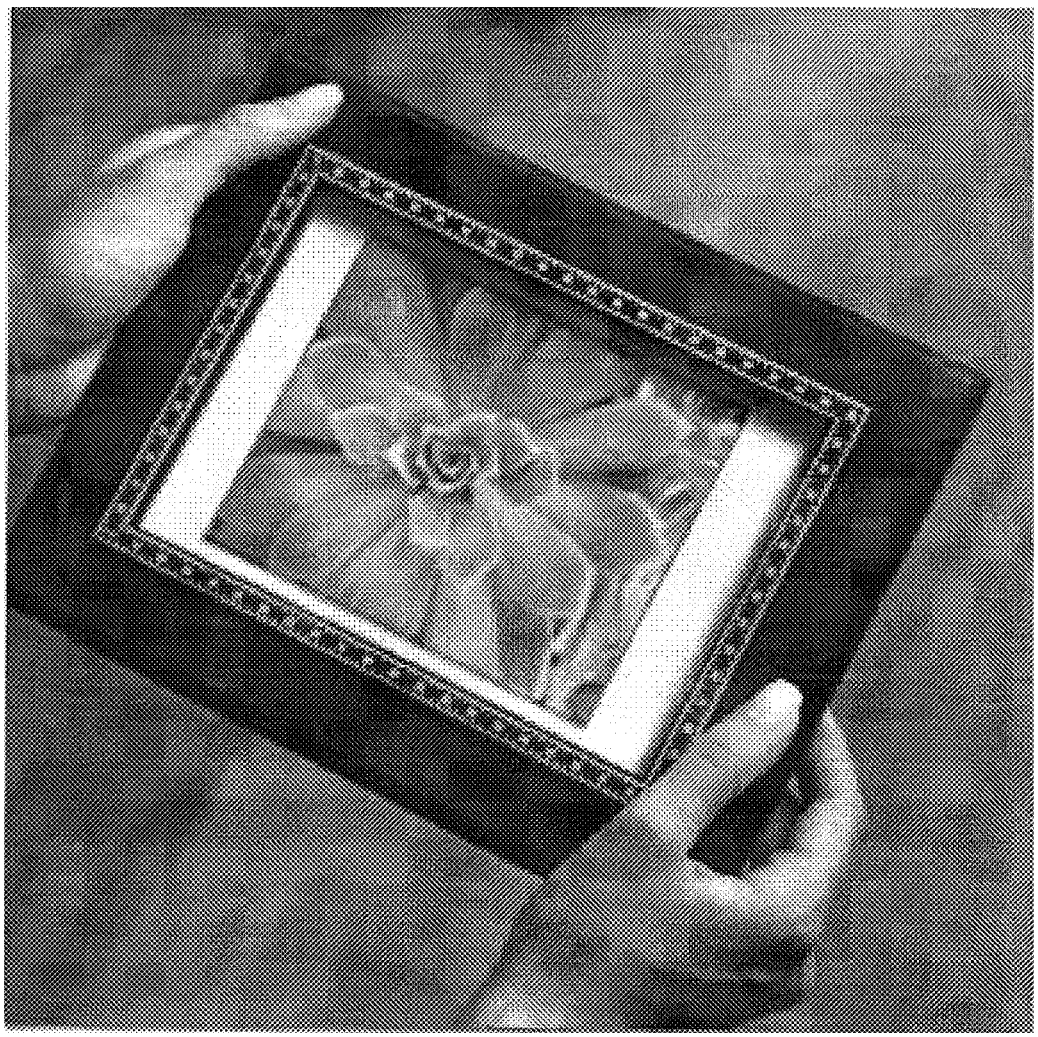

Process 600 also includes displaying the perspective frame preview image (block 608 shown in FIG. 6). For example, the web front end 512 can generate a web page including the perspective frame preview image and transmit it to the browser executing on the client computer 504. The browser then displays the perspective frame preview image for the user. An example of a web page 708 including a perspective frame preview image 710 is shown in FIG. 7C.

Then, an order for a framed image print can be received (block 610). For example, the framed image print can be produced by the print lab 520. The print lab 520 can receive the user's selection of an print image and frame, generate an image print from the selected print image, and mount the print image in the selected frame. Then the frame image print can be shipped to the user (block 612).

The invention can be implemented in digital electronic circuitry, or in computer hardware, firmware, software, or in combinations of them. Apparatus of the invention can be implemented in a computer program product tangiblyl embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer program interact with users.

Figure 8:
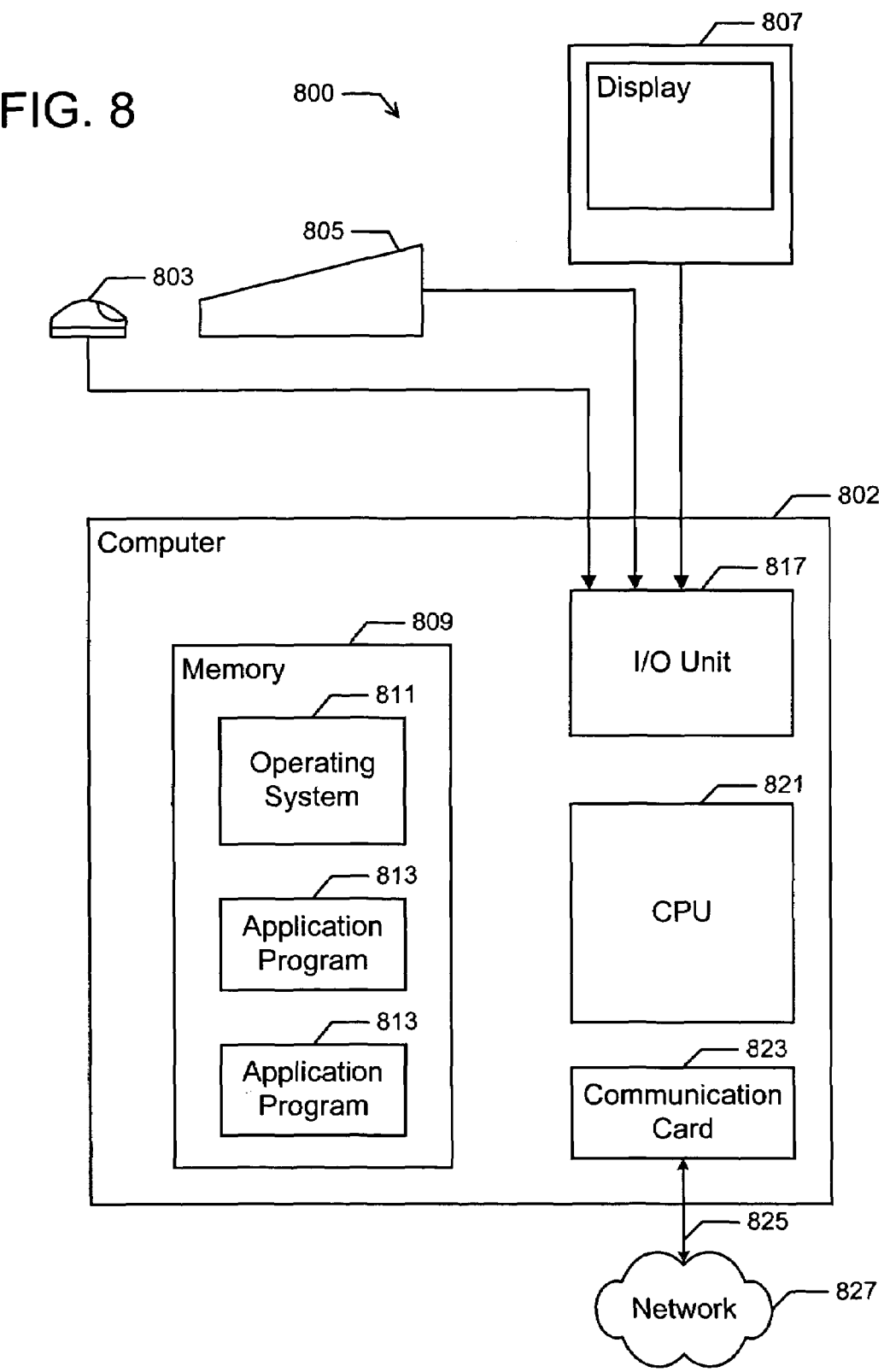
FIG. 8 is a block diagram of a computer system.

An example of one such type of computer is shown in FIG. 8, which shows a block diagram of a computer system 800 suitable for implementing or performing the apparatus or methods of the invention. The computer system 800 illustrated in FIG. 8 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 803, keyboard 805, and display 807) and a general purpose computer 802 having a central processor unit (CPU) 821, an I/O unit 817 and a memory 809 that stores data and various programs such as an operating system 811, and one or more application programs 813. The computer system 800 also typically includes some sort of communications card or device 823 (e.g., a modem or network adapter) for exchanging data with a network 827 via a communications link 825 (e.g., a telephone line).

A number of implementations of the invention have been described. Nevertheless, it will be understood that various modifications may be made without departing from the spirit and scope of the invention.

While the discussion above has focused on the presentation of images in frames, the techniques disclosed are equally well suited for other image based products. For example, a photocard is another example of an image based product that can be presented in accordance with the teachings above. Rather than a non-perspective view of the front of the photocard, a perspective view that shows the photocard in a particular environment can be presented. In addition, the photocard can be illuminated using a natural lighting effect to provide a realistic presentation for the viewer. Other image based products can be presented in similar ways including image based greeting cards, mugs, shirts (t-shirts, golf shirts and the like) and other novelty items. Image based greeting cards can be shown in a perspective view that allows the user to read both the message on the card as well as view the front image. Alternatively, only a portion of the internal greeting may be visible. A shirt can be placed on a mannequin to simulate appearance of the product on a person.

The operations of the processes and methods described here can be performed in a different order and still achieve desirable results. Also, the processes, methods, and systems described here can be used to change a variety of product attributes. Accordingly, other implementations are within the scope of the following claims.

What is claimed is:

1. A method of generating a frame prototype image showing a picture image framed within a frame, the method comprising:
   providing a frame image showing the frame in a perspective view, the frame image having a picture portion corresponding to the portion of the frame used to view a picture mounted in the frame;
   texture mapping the picture image to the picture portion of the frame image using the illumination of the picture portion of the frame image in order to generate the frame prototype image; and
   multiplying a texture value at a pixel by the original pixel value of the picture image to generate the frame prototype image.

2. The method of claim 1, further comprising identifying a picture portion of the frame image.

3. The method of claim 2, wherein identifying the picture portion of the frame image includes providing a mat identifying the picture portion of the frame image.

4. The method of claim 3, wherein the mat includes a plurality of pixels, each pixel having a pixel value.

5. The method of claim 4, wherein identifying the picture portion of the frame image includes setting each pixel in the mat that corresponds to the picture portion of the frame image to a first pixel value.

6. The method of claim 2, wherein identifying the picture portion of the frame image include identifying the outer perimeter of the picture portion of the frame image.

7. The method of claim 1, wherein the picture portion of the frame image has a quadrilateral shape and the method further includes identifying the picture portion of the frame image including identifying the four corners of the picture portion.

8. The method of claim 1, further comprising displaying the frame prototype image.

9. The method of claim 1, mapping the picture image to the picture portion of the frame image includes texture mapping the picture image to the picture portion of the frame image.

10. The method of claim 1, wherein the frame image is captured using a digital camera.

11. A computer program product tangibly embodied in a computer-readable medium, for generating a frame prototype image showing a picture image framed within a frame, comprising instructions operable to cause a computer to:
   receive the picture image;
   store a frame image showing the frame in a perspective view and a mat identifying the picture portion of the frame image;
   texture map the picture image to the picture portion of the frame image using the illumination of the picture portion of the frame image in order to generate the frame prototype image; and
   multiply a texture value at a pixel by the original pixel value of the picture image to generate the frame prototype image.

12. The computer program product of claim 11 further comprising instructions operable to cause the computer to generate the map.

13. The computer program product of claim 12 further comprising instructions operable to cause the computer to generate the map by identifying the picture portion of the frame image.

14. The computer program product of claim 11 further comprising instructions operable to cause the computer to identify the picture portion of the frame image by identifying the outer perimeter of the picture portion of the frame image.

15. A system for generating a frame prototype image showing a picture image framed within a frame, the system comprising:
   a client computer in communication with a computer network;
   a server, in communication with a computer network, having server software embodied in a computer-readable medium, the server software comprising instructions operable to cause the server to:
   receive the picture image from the client computer;
   store a frame image showing the frame in a perspective view and a mat identifying the picture portion of the frame image;
   texture map the picture image to the picture portion of the frame image using the illumination of the picture portion of the frame image in order to generate the frame prototype image,
   wherein the client computer includes client software embodied in a computer-readable medium, the client software comprising instructions operable to cause the client computer to upload the picture image to the server.

16. A method of generating a visual representation of an image based product, the method comprising:
   providing an image to be included in the image based product;
   providing a perspective image showing the image based product in a perspective view, the perspective image having a picture portion corresponding to the portion of the image based product used to view a picture mounted on the image based product; and
   texture mapping the image to the picture portion of the perspective image using the illumination of the picture portion of the frame image in order to generate the perspective prototype image; and
   multiplying a texture value at a pixel by the original pixel value of the picture image to generate the frame prototype image.

17. The method of claim 16 wherein the image based product is a framed picture.

18. The method of claim 16 wherein the image based product is a photocard.

19. The method of claim 16 wherein the image based product is a photo greeting card.

20. The method of claim 19 wherein the method includes displaying the perspective image in an environment that provides a context for viewing the image based product.

* * * * *